Sept. 5, 1944.  M. TURCHAN ET AL  2,357,790
HYDRAULIC DUPLICATING PLANER ATTACHMENT
Filed July 26, 1941  6 Sheets-Sheet 1

INVENTORS
Manuel Turchan
BY Curtis Walker
Robert A. Sloan
ATTORNEY

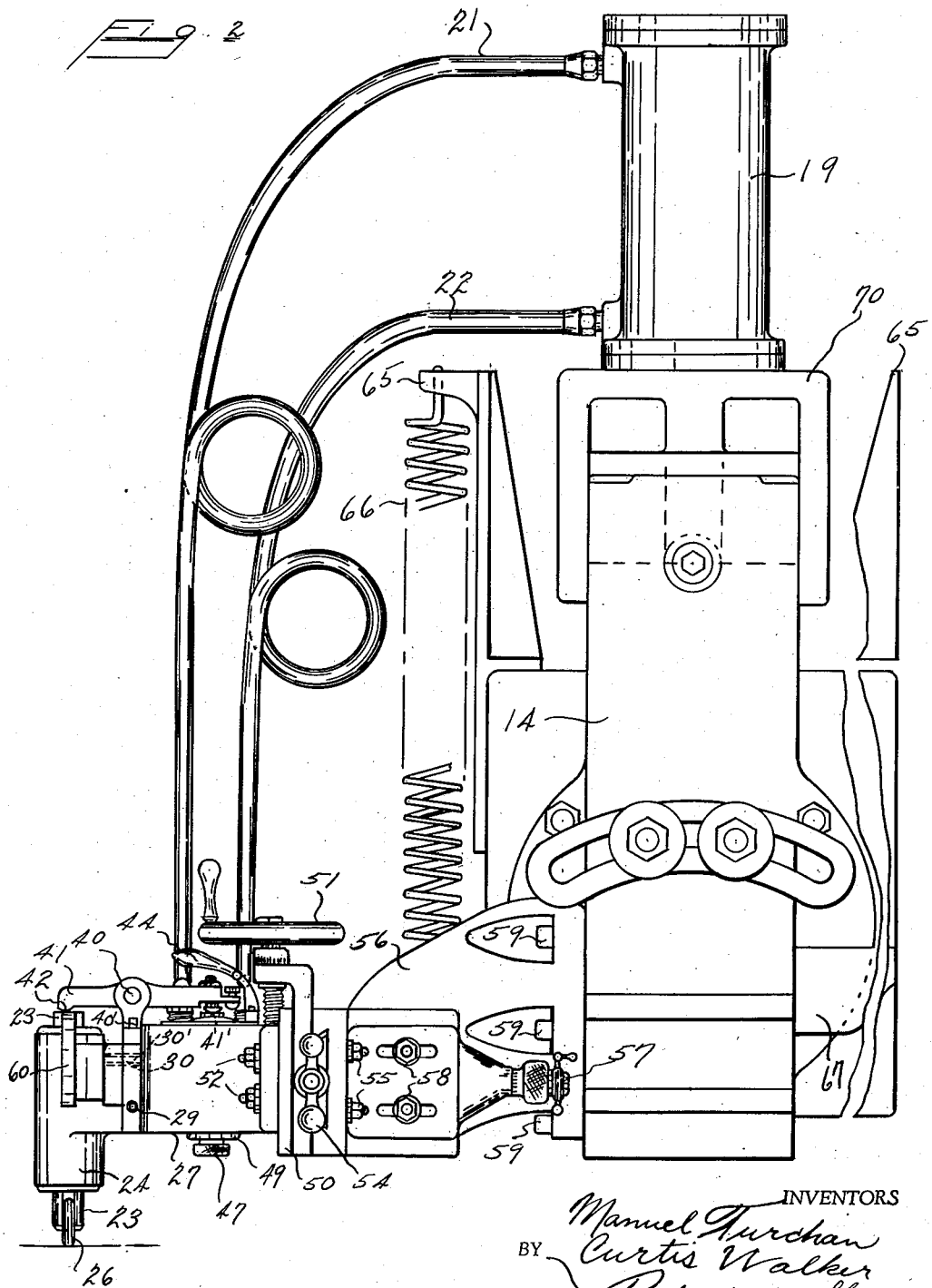

Sept. 5, 1944.  M. TURCHAN ET AL  2,357,790
HYDRAULIC DUPLICATING PLANER ATTACHMENT
Filed July 26, 1941  6 Sheets-Sheet 3
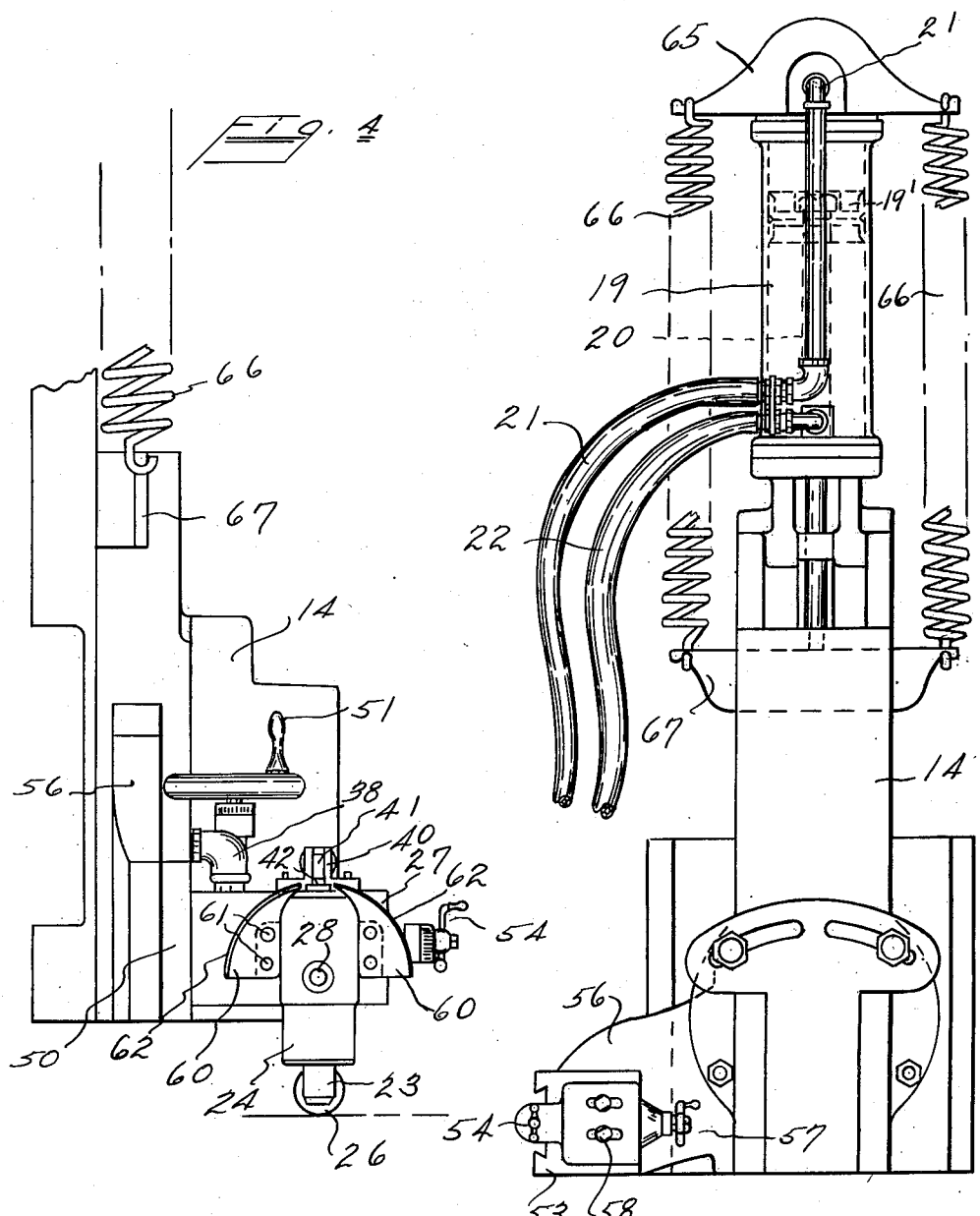

Sept. 5, 1944.   M. TURCHAN ET AL   2,357,790
HYDRAULIC DUPLICATING PLANER ATTACHMENT
Filed July 26, 1941   6 Sheets-Sheet 4

INVENTORS
Manuel Turchan
Curtis Walker
BY
Robert A. Sloman
ATTORNEY.

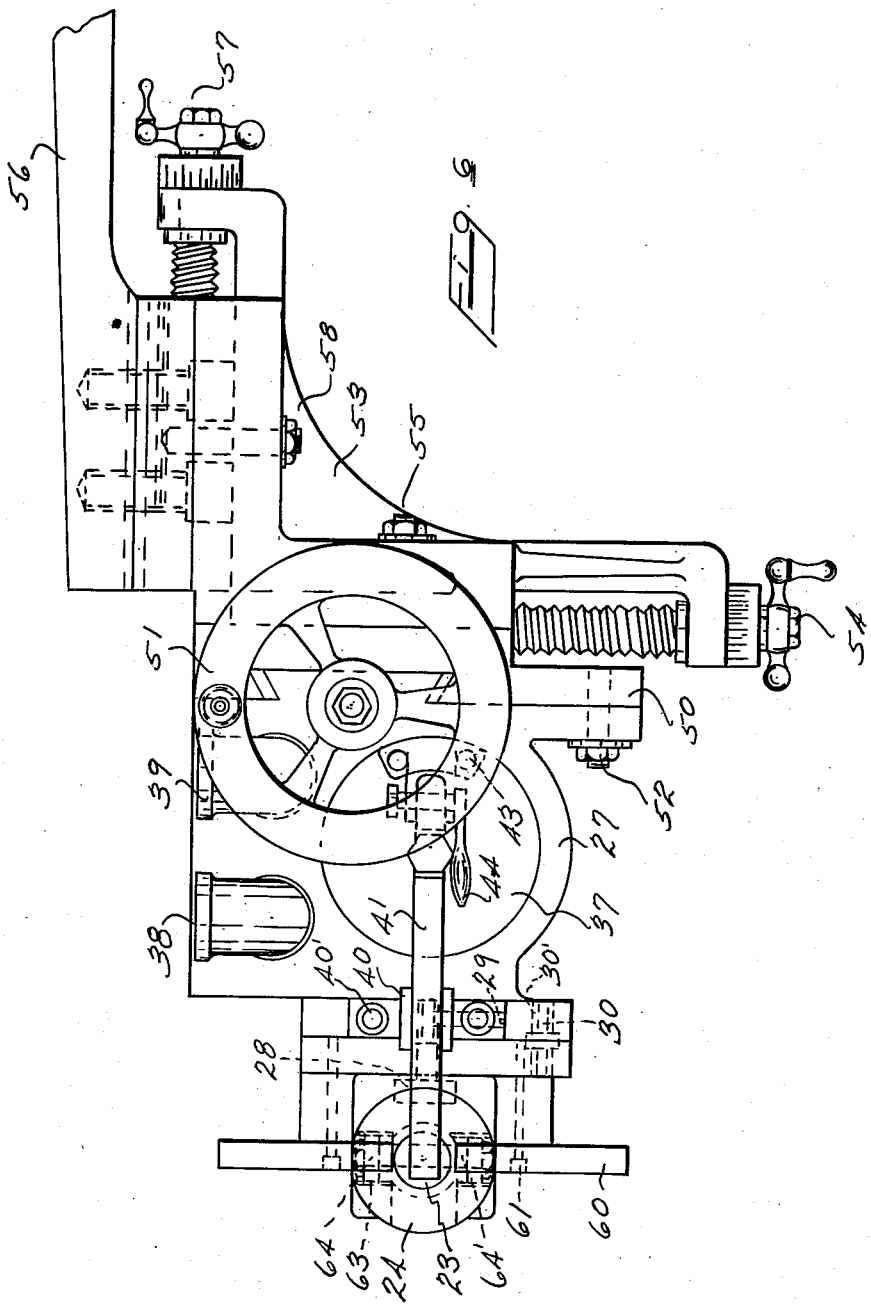

Sept. 5, 1944.     M. TURCHAN ET AL     2,357,790
HYDRAULIC DUPLICATING PLANER ATTACHMENT
Filed July 26, 1941     6 Sheets-Sheet 6
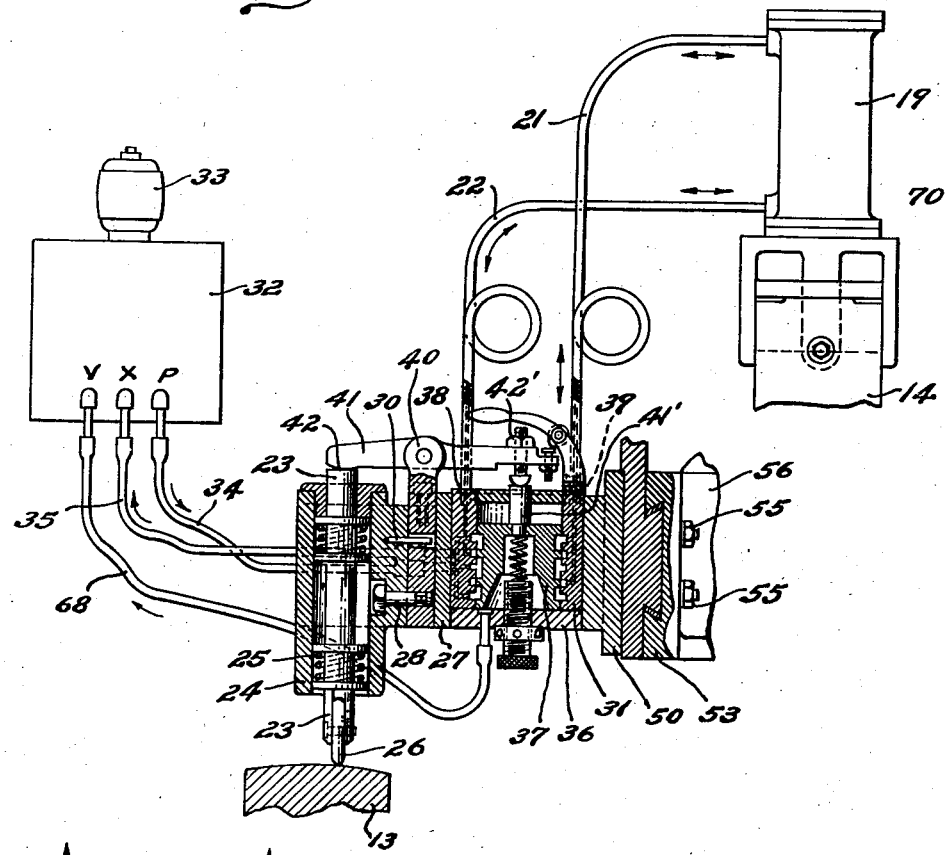
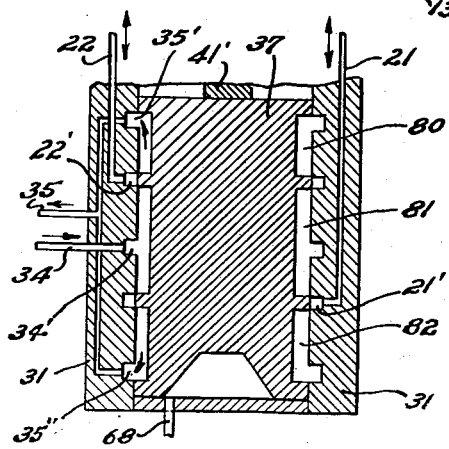
INVENTOR.
MANUEL TURCHAN
BY CURTIS WALKER
Robert A. Sloman
ATTORNEY Patented Sept. 5, 1944

2,357,790

UNITED STATES PATENT OFFICE 2,357,790

HYDRAULIC DUPLICATING PLANER ATTACHMENT

Manuel Turchan and Curtis Walker, Detroit, Mich.

Application July 26, 1941, Serial No. 404,162

20 Claims. (Cl. 90—24.3)

This invention relates to a hydraulic duplicating planer attachment; and more particularly to a pattern controlled mechanism adapted to automatically govern reciprocable feeding of a planer tool with respect to a longitudinally reciprocable workpiece, wherein it is sought to reproduce said pattern.

The invention also includes an attachment to govern reciprocable feed of a work-table with respect to a longitudinally reciprocable planer tool or the like. However, for the purpose of this disclosure, the description of a preferable embodiment of the invention will be limited to the former conventional type of planer.

It is the object of this invention to provide a novel hydraulic duplicating attachment for a planer characterized by extreme simplicity and versatility.

It is the further object to provide a novel tracer actuated fluid pressure control for directing fluid under pressure to one side or the other of a moveable piston within a stationary cylinder for reciprocably feeding a planer head with respect to a workpiece.

It is the further object as above stated whereby fluid is directed to one side or the other of a stationary piston within a movable cylinder for reciprocably feeding a planer head with respect to a longitudinally reciprocable workpiece.

It is the further object herein to provide an indirect tracer regulator for the fluid pressure control mechanism whereby vertical movement of the tracer spindle actuated by a pattern engaging roller on the end thereof is transferred to a fluid control piston independent of said spindle through a pressure arm or lever mechanism engaged by said spindle.

It is the further object of this invention to provide a safety mechanism in conjunction with the tracer mechanism of a planer attachment whereby contact with an obstruction to said tracer will cause the planer head to be withdrawn from the workpiece to prevent spoilage thereof or breakage of the cutting tool.

It is the further object of this invention to provide a tracer housing pivotally joined to a tracer head, but maintained against pivotal movement by means of a safety shear pin. Said shear pin is adapted to give way upon the tracer encountering an obstruction whereby the tracer is rotated about its support in either direction for actuating said safety mechanism.

It is the further object to provide a spring or other resilient planer head and attachment counterbalance for facilitating elevation of the planer head and attachment and for maintaining the same in elevated position when inoperative.

The invention further relates to the various arrangements of elements and their various combinations as hereinafter set out in conjunction with the accompanying drawings, of which:

Figure 2 is an elevational view of a cylinder reciprocated planer head and the tracer attachment therefor.

Figure 3 is an elevational view of a piston reciprocated planer head with tracer attachment omitted.

Figure 4 is a fragmentary side elevational view of Figure 2.

Figure 6 is a top plan view thereof.

Fig. 7 is a fragmentary diagrammatic partially sectioned view of the tracer and valve mechanism, the feed cylinder, the fluid pressure source, and the hydraulic connections therebetween.

Fig. 8 is a fragmentary sectioned view of the valve piston 37 and cylinder sleeve 31 showing the hydraulic conduits therein.

It will be understood that the above drawings are illustrations of preferable embodiments of the invention merely by example, and it is not intended that the invention be limited thereby.

Figure 1:
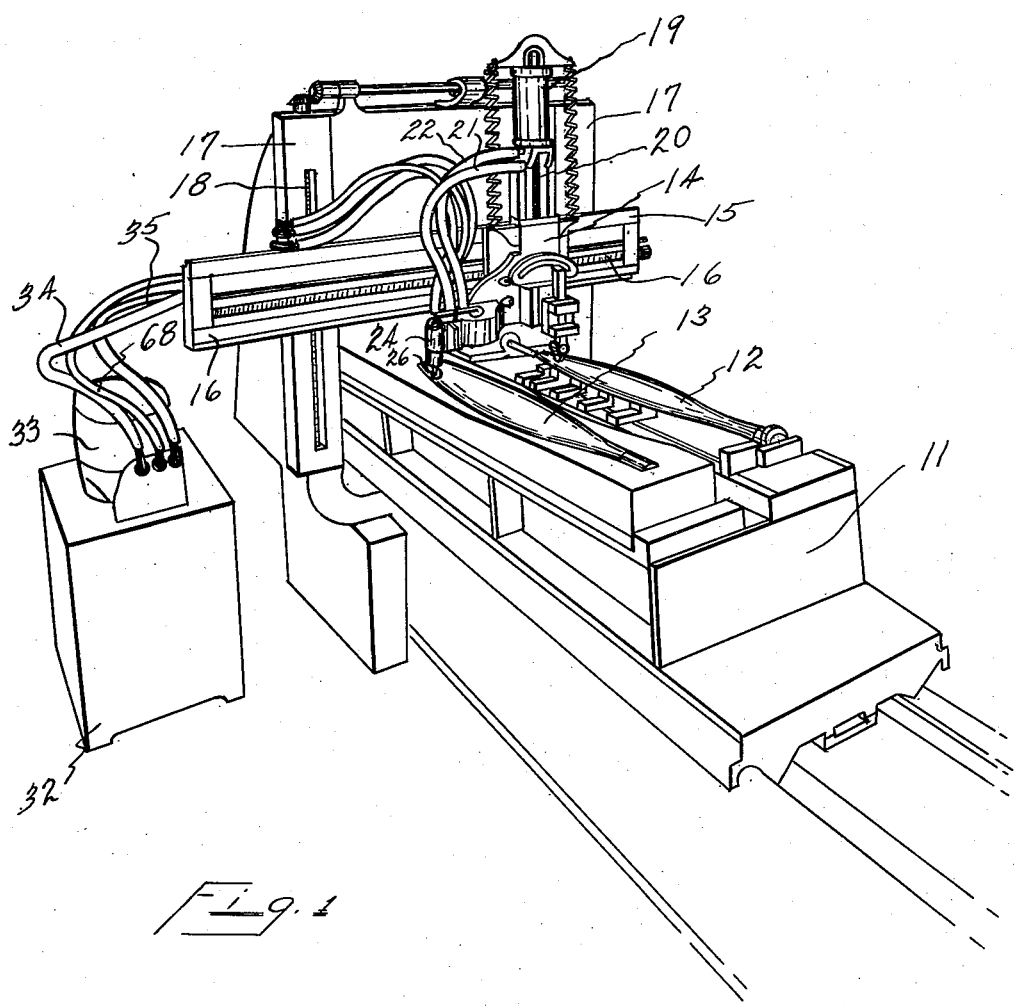
Figure 1 is a perspective view of a planer and the duplicating attachment therefor.

In the drawings Figure 1 illustrates a planer mechanism consisting of a longitudinally reciprocable workpiece and pattern supporting table 11, workpiece 12 and a pattern 13 being suitably secured thereon to move therewith.

The planer head 14 for securing a suitable cutting tool adjacent the workpiece is supported upon the slide member 15, with a screw member 16 interposed therebetween permitting mechanical transverse feeding of said planer head with respect to the workpiece.

It will be noted that slide member 15 is also mounted upon the upright slide members 17 with suitable interconnected screw members 18 providing for mechanical vertical adjustment of the planer head 14 with respect to the work.

In order to make this latter adjustment automatic and to make the reciprocable movement of said head correspond to the shape and the contour of the pattern 13, a hydraulic duplicating attachment is provided.

In Figures 1 and 3, cylinder 19 has a reciprocable piston 19' therein suitably joined to the planer head 14 by piston rod 20.

Conduits 21 and 22 from the fluid control cylinder later to be described, communicate respectively with the interior of said cylinder 19 above and below piston 19' whereby said piston is forcibly and hydraulically actuated and reciprocated for accomplishing automatic feeding of the planer head 14 with respect ot the workpiece 12.

The tracer attachment mechanism now to be described is adapted to control the flow of fluid under pressure through the above mentioned conduits 21 and 22.

Figure 5:
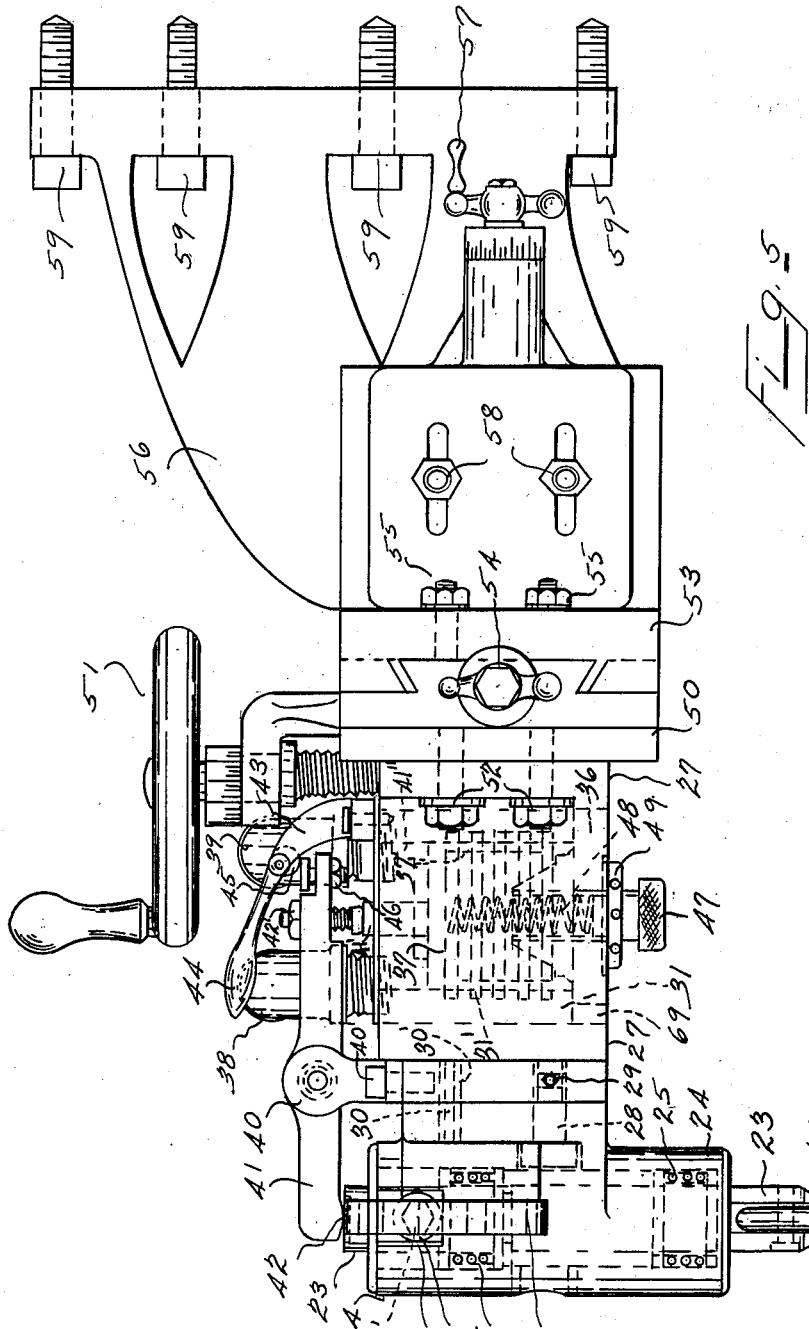
Figure 5 is an elevational view of the planer tracer attachment.

Referring to Figure 5 it is seen that the spindle 23 longitudinally reciprocable within the spindle housing 24 with suitable bearings 25 interposed, has a pattern engaging roller 26 on the end thereof.

The spindle housing is pivotally mounted and secured to the tracer head 27 by means of a shoulder screw 28 secured therein by a set screw 29. Said housing is further secured to said tracer head by means of a safety shear pin 30 made of any relatively soft metal, with suitable bushings 30' within said tracer housing and tracer head for receiving said pin.

If the tracer roller 26 encounters a sharp obstruction, tracer housing 24 will pivot around the pivot screw 28 relative to the tracer head 27, shearing the safety pin 30. Therefore it is seen that the tracer housing 24 is adapted to pivot in either direction for actuating a safety mechanism hereinafter to be described in detail.

The tracer head 27 has a cylindrical opening therethrough and a sleeve member 31 disposed therein provides a fluid cylinder, said sleeve member 31 having a plurality of annular openings therein joined to suitable fluid inlets and outlets.

The hydraulic unit 32 shown in Figure 1, is provided with an electric or other pump 33 for supplying fluid under pressure to and from said cylinder by means of flexible conduits 34 and 35.

Conduit 34 from the hydraulic unit 32 provides fluid under pressure through the valve housing 27 connecting with the annular recess 34' in the sleeve 31. Exhaust conduit 35 back to the hydraulic unit 32 connects housing 27 through suitable passages therein joining the two annular openings 35' and 35''.

Sleeve 31 also has two annular openings 21' and 22' which connect with conduits 21 and 22 respectively for supplying fluid under pressure to one end or the other of reciprocable cylinder 19.

A cap member 36 in Figure 5 is threadably secured upon the bottom of the tracer head 27 providing a closure therefor. Piston 37 having a plurality of exterior annular grooves 80, 81 and 82 corresponding to the annular grooves 35', 34' and 35'' respectively in said sleeve member, is adapted to reciprocable movement within said sleeve for governing the flow of fluid to and from cylinder 19 and sleeve 31 through the conduits 21 and 22 respectively, and through conduits 34 and 35 to and from the fluid pressure unit 32.

A plurality of conduits are disposed within the tracer head 27 and the sleeve member 31 whereby fluid entering said sleeve through the conduit 34 is conducted to recess 34' in sleeve 31 and through recess 81 in valve 37 and thence to one or the other of the outlets 38 and 39 in said tracer head for communicating with conduits 21 and 22 respectively.

For example, if the piston 37 is depressed slightly by action of arm 41, fluid under pressure from conduit 34 goes to recess 34', into recess 81, and thence into recess 21', whence it is conducted through the sleeve 31 to the conduit 21, to the upper end of the cylinder 19. This causes an upward movement of said cylinder and a corresponding movement of the cutter depending from the vertically reciprocable head 14 which is similarly joined to said cylinder.

Fluid on the other side of the piston within cylinder 19 is forced out through conduit 22 whence it enters recess 22' and thence to recess 80, and recess 35', which joins the return exhaust conduit 35 back to the hydraulic unit 32.

On the other hand if piston 37 is slightly elevated above normal position, fluid from conduit 34 travels via 34', 81, 22', and then through conduit 22 to the lower end of cylinder 19. This causes cylinder 19 to descend.

Fluid is forced back out through conduit 21 which travels via 21', 82, 35'' joining the return conduit 35 back to the hydraulic unit.

Thus on movement of piston 37 the central recess 81 therein governs flow of fluid under pressure to either conduit 21 or 22. The outer recesses 80 and 82 in the piston are adapted to connect the exhaust conduit 35 with either conduit 22 or 21.

Consequently it is seen that by controlling the reciprocable movement of piston 37 that fluid under pressure is delivered through conduits 21 and 22 to one side or the other of the movable piston 19' within the stationary cylinder 19 as in Figures 1 and 3. At the same time fluid forced out from the other side of said piston is returned to the tracer head whence it is conducted back to the fluid sump through the conduit 35.

A bracket member 40 secured to the top of the tracer head 27 intermediate tracer spindle 23 and piston 37 by bolts 40' provides a pivotal support for the pressure arm 41, with suitable needle bearings therebetween.

One end of said arm has a curved downwardly projected surface 42 for engaging the top of the spindle 23. An adjustable nut 42' is disposed near the opposite end of said arm for cooperative engagement with the top surface of the piston rod 41' forming a part of piston 37 for actuating the same within the sleeve member 31. A suitable adjusting nut 41'' is threaded into the top of the sleeve 31 forming a closure therefor.

This reciprocable movement of spindle 23 following the contour of the pattern is translated through the pressure arm 41 to piston 37, whereby fluid under pressure from hydraulic unit 32 is conducted to one side or the other of the movable piston 19' within the cylinder 19, causing a corresponding movement of the planer head 14.

Guide plates 63 are longitudinally disposed within the top portion of spindle housing 24, with the roller guides 64 oppositely disposed therebetween. Said guide members cooperatively engage opposite sides of spindle 23 with a suitable bolt 64' transversely disposed through said spindle and guides 64 for maintaining the latter in engagement with said spindle preventing twisting thereof. Thus roller 26 is always maintained in a plane parallel to the direction of movement of the pattern.

It will be noted that the guide rollers 64 are adapted to raise and lower between their guide plates 63 in cooperating relation with reciprocable spindle 23, which latter has a suitable slot for receiving the bolt 64'.

A manual control is also provided to operate independent of spindle 23, consisting of a bracket 43 secured upon the tracer head, and having a handle member 44 pivotally mounted in said bracket for rotating a cam member 45 for engagement with an adjustable bolt 46 on the end of the pressure arm 41.

Piston member 37 is recessed on its under surface for receiving the hollow adjusting nut 47. The latter has longitudinally disposed therein a coil spring 48 providing a resilient seat for said piston and providing for initial adjustment thereof within the sleeve member 31. A lock nut 49 is journaled around the adjusting nut, and threadably engages the cap member 36.

Tracer head 27 is slidably journaled upon the adjusting dovetail block 50 for manual vertical adjustment of said tracer head with respect to the pattern 13. A suitable threaded shaft is interposed therebetween actuated by the vertical adjusting wheel 51. Bolts 52 are provided to obtain a vertical adjusting lock between said tracer head and said block 50.

Block 50 also has a suitable dovetail for sliding engagement with an adjusting angle member 53 permitting a manual transverse or cross adjustment of the tracer head. This is accomplished by a suitable threaded shaft actuated by a handle 54. Bolts 55 are also provided to obtain a cross adjusting lock of this adjustment as desired.

The above adjusting angle member 53 is also longitudinally and slidably mounted upon a bracket member 56 for providing further a manual longitudinal adjustment of the tracer head 27. A threaded member is interposed between said adjusting angle member and said bracket with a suitable horizontal adjusting handle 57 provided for actuating the same. Furthermore bolts 58 are provided for obtaining a positive lock of this longitudinal adjustment of the tracer head.

Bracket member 56 therefore provides the intermediate support for the tracer head 27 which is manually adjustable thereon vertically, horizontally and transversely.

Said bracket in turn is secured to the planer head 14 by a plurality of bolts 59 as in Figure 5 whereby it is seen that the tracer regulates the movement of the planer head as above described and furthermore is secured thereto for corresponding movement therewith.

The safety mechanism above mentioned for said tracer consists of a pair of transversely extending safety arms 60 as shown in Figures 2, 4, 5, and 6 secured to the tracer housing 24 by suitable bolts 61. When the tracer housing rotates due to a shearing of the safety pin 30 on reaching an object which the tracer roller 26 is not supposed to contact, said safety arms rotate therewith.

It will be noted from Figure 4 that the outside edges of said arm have cam surfaces 62, either of which is adapted to engage the end 42 of the pressure arm 41 for upwardly tilting the same to actuate the piston 37. It will be noted that said spindle housing can rotate in either direction, and that either of the safety arms may be employed depending upon the direction of rotation.

In order to effect a counter-balancing of the planer head 14 as in Figures 1 and 3 a suitable bracket 65 is provided attached to the top of cylinder 19 for supporting the coil springs 66 the lower ends of which are secured by a suitable anchor bracket 67 to the planer head 14.

The advantage of these springs resides in their counter-balancing action and furthermore in their action of preventing the planar head and the cutting tool from creeping downwardly upon the work injuring the same when the planer mechanism and the attachment mechanism are inoperative.

A third conduit 68 is joined to a vacuum source within the hydraulic unit 32, and on its other end communicates with an opening 69 in cap 36 in the bottom of the tracer head 27. Thus means are provided for scavenging any fluid or oil seepage in said tracer head, and returning the same back to the hydraulic unit 32.

Figure 2 is substantially similar to Figure 3 with the exception that cylinder 19 reciprocates with respect to a stationary piston. A cylinder bracket 70 depends from cylinder 19 and is suitably secured to the reciprocable planer head 14. The operation, however, is the same as that described in connection with Figures 1 and 4.

Inasmuch as cylinder 19 reciprocates, the upper spring supporting brackets 65 are secured to the stationary guide for the planer head.

It will be noted that the fluid control piston 37 is remote from spindle 23 thereby providing for the pivoting tracer housing 24, which is incorporated as a safety mechanism as above described in detail.

It will be noted further that as piston 19′ reciprocates, it is necessary that conduits 21 and 22 be flexible.

It is understood also that the principle of this invention may be satisfactorily practiced by placing the tracer head and control cylinder directly above the tracer spindle.

Having described our invention reference should now be had to the claims which follow for determining the scope thereof.

We claim:

1. A hydraulic duplicating attachment for a reciprocable planer head comprised of a tracer housing, a longitudinally disposed spindle projecting therefrom, with a pattern engaging means on the end thereof, a tracer head adjustably secured to said planer head movable therewith, reciprocable means joining said planer head, means pivotally mounting said housing to said tracer head, shearable locking means interposed therebetween, and spindle actuated fluid controlling means in said tracer head for controlling the flow of fluid under pressure to said planer head reciprocating means.

2. A hydraulic duplicating attachment for a cylinder reciprocated planer head comprised of a tracer housing, a reciprocable pattern engaging spindle projecting therefrom, spindle actuated fluid control means joined to said head and movable therewith, for controlling the flow of fluid from a pressure source to said cylinder, means pivotally mounting said housing to said control means, and a shearable locking means interposed therebetween.

3. A hydraulic duplicating attachment for a piston actuated reciprocable planer head comprised of a stationary cylinder for said piston, a tracer housing, a reciprocable pattern engaging spindle projecting therethrough, spindle actuated fluid control means joined to said head and movable therewith, for controlling the flow of fluid from a pressure source to said cylinder, means pivotally mounting said housing to said control means, and a shearable locking means interposed therebetween.

4. A hydraulic duplicating attachment for a cylinder reciprocated planer head comprised of a tracer housing, a reciprocable pattern engaging spindle projecting therethrough, spindle actuated fluid control means joined to said head and movable therewith, for controlling the flow of fluid from a pressure source to said cylinder, means pivotally mounting said housing to said control means, a shearable locking means interposed therebetween, an immovable bracket adjacent said planer head, and resilient counterbalancing means interposed therebetween.

5. A hydraulic duplicating attachment for a piston actuated reciprocable planer head comprised of a stationary cylinder for said piston, a tracer housing, a reciprocable pattern engaging spindle projecting therethrough, a spindle actuated fluid control means joined to said head and movable therewith, for controlling the flow of fluid from a pressure source to said cylinder, means pivotally mounting said housing to said control means, a shearable locking means interposed therebetween, a bracket secured to said cylinder, and resilient counterbalancing means interposed therebetween.

6. A hydraulic duplicating attachment for a cylinder actuated reciprocable planer head comprised of a pattern engaging tracer, tracer actuated fluid control means joined to said head for controlling flow of fluid from a pressure source to said cylinder, means pivotally mounting said tracer to said control means, and a shearable locking means interposed therebetween.

7. A hydraulic duplicating attachment for a cylinder reciprocated planer head comprised of a pattern engaging tracer, a valve housing to which said tracer is pivotally mounted, and within which is a reciprocable valve piston for controlling the flow of fluid from a pressure source to both ends of said cylinder, adjustable means interconnecting said housing and said planer head, a safety shearing pin between said tracer and housing, pivoted means interconnecting said tracer with said piston, and a cam on said tracer for actuating said pivoted means when said tracer is tilted about its pivotal axis upon engaging an obstruction.

8. A hydraulic duplicating attachment for a cylinder reciprocated planer head comprised of a tracer housing, a reciprocable pattern engaging spindle projecting therethrough, a valve housing to which said tracer is pivotally mounted, and within which is a reciprocable valve piston for controlling the flow of fluid from a pressure source to both ends of said cylinder, adjustable means interconnecting said housing and said planer head, a safety shearing pin between said tracer and housing, pivoted means interconnecting said spindle with said piston, and a cam on said tracer housing for actuating said pivoted means when said spindle is tilted around its axis upon engaging an obstruction.

9. A hydraulic duplicating attachment for a cylinder reciprocated planer head comprised of a tracer housing, a reciprocable spindle projecting therethrough with a pattern engaging means on the end thereof, guide means between said spindle and tracer housing to prevent axial twisting of said spindle, a valve housing to which said tracer is pivotally mounted, a reciprocable valve piston within said valve housing for controlling the flow of fluid from a pressure source to both ends of said cylinder, a safety shearing pin between said tracer and housing, pivoted means interconnecting said spindle with said piston, and a cam on said tracer housing for actuating said pivoted means when said spindle is rotated around its axis upon engaging an obstruction.

10. A hydraulic duplicating attachment for a cylinder reciprocated planer head comprised of a tracer housing, a reciprocable pattern engaging spindle projecting therethrough, a valve housing to which said tracer is pivotally mounted, a reciprocable valve piston within said valve housing for controlling the flow of fluid from a pressure source to both ends of said cylinder, a safety shearing pin between said tracer and housing, pivoted means interconnecting said spindle with said piston, a cam on said tracer housing for actuating said pivoted means when said spindle is tilted around its axis upon engaging an obstruction, and a manual control on said valve housing for actuating said pivoted means independent of said spindle.

11. A hydraulic duplicating attachment for a cylinder reciprocated planer head comprised of a tracer housing, a reciprocable pattern engaging spindle projecting therethrough, a valve housing to which said tracer is pivotally mounted, a reciprocable valve piston within said valve housing for controlling the flow of fluid from a pressure source to both ends of said cylinder, a safety shearing pin between said tracer and housing, pivoted means interconnecting said spindle with said piston, and a pair of oppositely disposed cams on said tracer housing, either of which being adapted to actuate said pivoted means when said spindle is tilted in either direction around its pivotal axis upon engaging an obstruction.

12. In a hydraulic duplicating attachment for a cylinder reciprocated planer head, a pattern engaging tracer, a valve housing joined to said head, pivotal means interconnecting said tracer and housing, a safety shear pin interposed therebetween, a reciprocable piston within said valve housing actuated by said tracer for controlling fluid under pressure to said cylinder, and a cam mechanism on said tracer adapted to actuate said piston upon pivotal movement of said tracer.

13. The combination with a cylinder reciprocated planer head carrying a work tool, and a stationary piston within said cylinder; of a hydraulic unit for supplying fluid under pressure; and a pattern duplicating attachment for said head consisting of a valve housing adjustably secured to said head, conduits joined thereto connecting both ends of said cylinder, and also interconnecting said hydraulic unit, a reciprocable valve in said housing for controlling communication between said conduits, a pattern engaging tracer pivotally joined to said housing for pivotal deflection upon engaging an obstruction, a shearing pin between said tracer and housing, and interconnecting means between said tracer and valve for regulating the latter.

14. The combination with a cylinder reciprocated planer head carrying a work tool, and a stationary piston within said cylinder; of a hydraulic unit for supplying fluid under pressure; and a pattern duplicating attachment for said head consisting of a valve housing adjustably secured to said head, conduits joined thereto connecting both ends of said cylinder, and also interconnecting said hydraulic unit, a reciprocable valve in said housing for controlling communication between said conduits, a pattern engaging tracer pivotally joined to said housing for pivotal deflection upon engaging an obstruction, a shearing pin between said tracer and housing, interconnecting means between said tracer and valve for regulating the latter, and a cam upon said tracer for actuating said valve when the tracer is deflected.

15. The combination with a cylinder reciprocated planer head carrying a work tool, and a stationary piston within said cylinder; of a hydraulic unit for supplying fluid under pressure, and also a vacuum; and a pattern duplicating attachment for said head consisting of a valve housing adjustably secured to said head, conduits joined thereto connecting both ends of said cylinder, and also interconnecting said fluid pressure source, and said vacuum source for scavenging fluid leakage in said housing, a reciprocable valve in said housing for controlling communication between said conduits, a pattern engaging tracer pivotally joined to said housing for pivotal deflection upon engaging an obstruction, a shearing pin between said tracer and housing, and interconnecting means between said tracer and valve for regulating the latter.

16. In a hydraulic duplicating attachment for a cylinder reciprocated planer head, a valve housing joined to said head, a longitudinally reciprocable pattern engaging spindle pivotally joined to said housing, a reciprocable valve within said housing for controlling fluid under pressure to both ends of said cylinder, a shear pin between said spindle and said housing, pivotal means on said housing interconnecting said spindle and said valve, and a cam on said spindle for actuating said pivotal means when said spindle is rotated upon encountering an obstruction.

17. A hydraulic duplicating attachment for a cylinder reciprocated planer head comprised of a pattern engaging tracer, a valve housing to which said tracer is pivotally mounted, a reciprocable valve piston within said valve housing for controlling the flow of fluid from a pressure source to both ends of said cylinder, a safety shearing pin between said tracer and housing, pivoted means interconnecting said tracer with said piston, and a cam on said tracer for actuating said pivoted means when said tracer is tilted about its pivotal axis upon engaging an obstruction.

18. A hydraulic duplicating attachment for a cylinder reciprocated planer head comprised of a tracer housing, a reciprocable pattern engaging spindle projecting therethrough, a valve housing to which said tracer is pivotally mounted, a reciprocable valve piston within said valve housing for controlling the flow of fluid from a pressure source to both ends of said cylinder, a safety shearing pin between said tracer and housing, pivoted means interconnecting said spindle with said piston, and a cam on said tracer housing for actuating said pivoted means when said spindle is tilted around its axis upon engaging an obstruction.

19. A hydraulic duplicating planer attachment comprised of a tracer housing, a longitudinally movable pattern engaging spindle projecting therefrom, a cylinder reciprocably movable in unison with said housing, a stationary piston in the cylinder relatively to which the cylinder is movable, a reciprocable work piece engaging planer head secured to said cylinder, a tracer head joined to said planer head, a fluid control mechanism within said tracer head communicating with said cylinder, means pivotally joining said tracer housing to said tracer head, and interconnecting spindle actuated means between said spindle and said fluid control.

20. A hydraulic duplicating attachment for a cylinder actuated reciprocable planer head comprised of a tracer housing, a pattern engaging spindle movable therein, spindle actuated fluid control means joined to said head for controlling flow of fluid from a pressure source to said cylinder, means pivotally mounting said tracer housing to said control means, a shearable locking means interposed therebetween, and oppositely arranged cams on said tracer housing for actuating said fluid control means when said tracer housing is rotated about its pivotal mounting on engaging an obstruction.

MANUEL TURCHAN.
CURTIS WALKER.